United States Patent
Li et al.

(10) Patent No.: US 7,851,944 B2
(45) Date of Patent: Dec. 14, 2010

(54) INTEGRATED UNINTERRUPTED POWER SUPPLY UNIT

(75) Inventors: Shumin Li, Shanghai (CN); Changying Wu, Shanghai (CN); Teck Joo Goh, Johor (MY)

(73) Assignee: Intel Corporation, Santa Clara, CA (US)

( * ) Notice: Subject to any disclaimer, the term of this patent is extended or adjusted under 35 U.S.C. 154(b) by 1021 days.

(21) Appl. No.: 10/581,756

(22) PCT Filed: Dec. 30, 2005

(86) PCT No.: PCT/CN2005/002402

§ 371 (c)(1),
(2), (4) Date: Jun. 5, 2006

(87) PCT Pub. No.: WO2007/076628

PCT Pub. Date: Jul. 12, 2007

(65) Prior Publication Data

US 2009/0044026 A1 Feb. 12, 2009

(51) Int. Cl.
*H02J 9/06* (2006.01)
(52) U.S. Cl. ..................................... 307/66
(58) Field of Classification Search ............ 307/64–66; 700/286, 288
See application file for complete search history.

(56) References Cited

U.S. PATENT DOCUMENTS

| 5,347,164 | A | * | 9/1994 | Yeh ............................ 307/66 |
| 5,563,778 | A | | 10/1996 | Oh |
| 5,657,257 | A | | 8/1997 | Kyung |
| 6,700,802 | B2 | * | 3/2004 | Ulinski et al. ................ 363/37 |
| 6,788,029 | B1 | * | 9/2004 | Gabrys ........................ 322/4 |
| 7,402,921 | B2 | * | 7/2008 | Ingemi et al. ................ 307/64 |

FOREIGN PATENT DOCUMENTS

| CN | 1122465 | 5/1996 |
| CN | 1484355 | 3/2004 |
| WO | WO-9115048 | 10/1991 |

OTHER PUBLICATIONS

International Search Report and Written Opinion, PCT/CN2005/002402, Nov. 16, 2006, 7 pages.

* cited by examiner

*Primary Examiner*—Albert W Paladini
(74) *Attorney, Agent, or Firm*—Blakely, Sokoloff, Taylor & Zafman LLP (57) ABSTRACT

A system may provide integrated uninterrupted power supply for computer systems. The system comprise a first unit that outputs an AC input voltage, and produces an AC output voltage from a battery voltage in response to the AC input voltage being absent; and a second unit that produces a DC output voltage from the AC input voltage, and produces the DC output voltage from the battery voltage in response to the AC input voltage being absent.

29 Claims, 4 Drawing Sheets

INTEGRATED UNINTERRUPTED POWER SUPPLY UNIT

CROSS-REFERENCE TO RELATED APPLICATION

This application is a National Phase application of, and claims priority to, International Application No. PCT/CN2005/002402, filed Dec. 30, 2005, entitled "INTEGRATED UNINTERRUPTED POWER SUPPLY UNIT".

BACKGROUND

Computer systems have been used in, e.g., some rural areas or areas outside major metropolitans. Normally, in these areas, there may be poor or inadequate power infrastructures. The computer systems may rely on common alternating current (AC) power. The computer systems may also use batteries; however, the batteries are not directly applicable to the computer systems or other AC peripheral equipments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques that may provide a system to supply power to a computing device. The implementation of the techniques is not restricted in computing systems; it may be used by any execution environments for similar purposes, such as, for example, desktop, laptop, server, mobile computing device, handheld computing device, mobile phone, or other environments and/or digital/electronic equipments. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
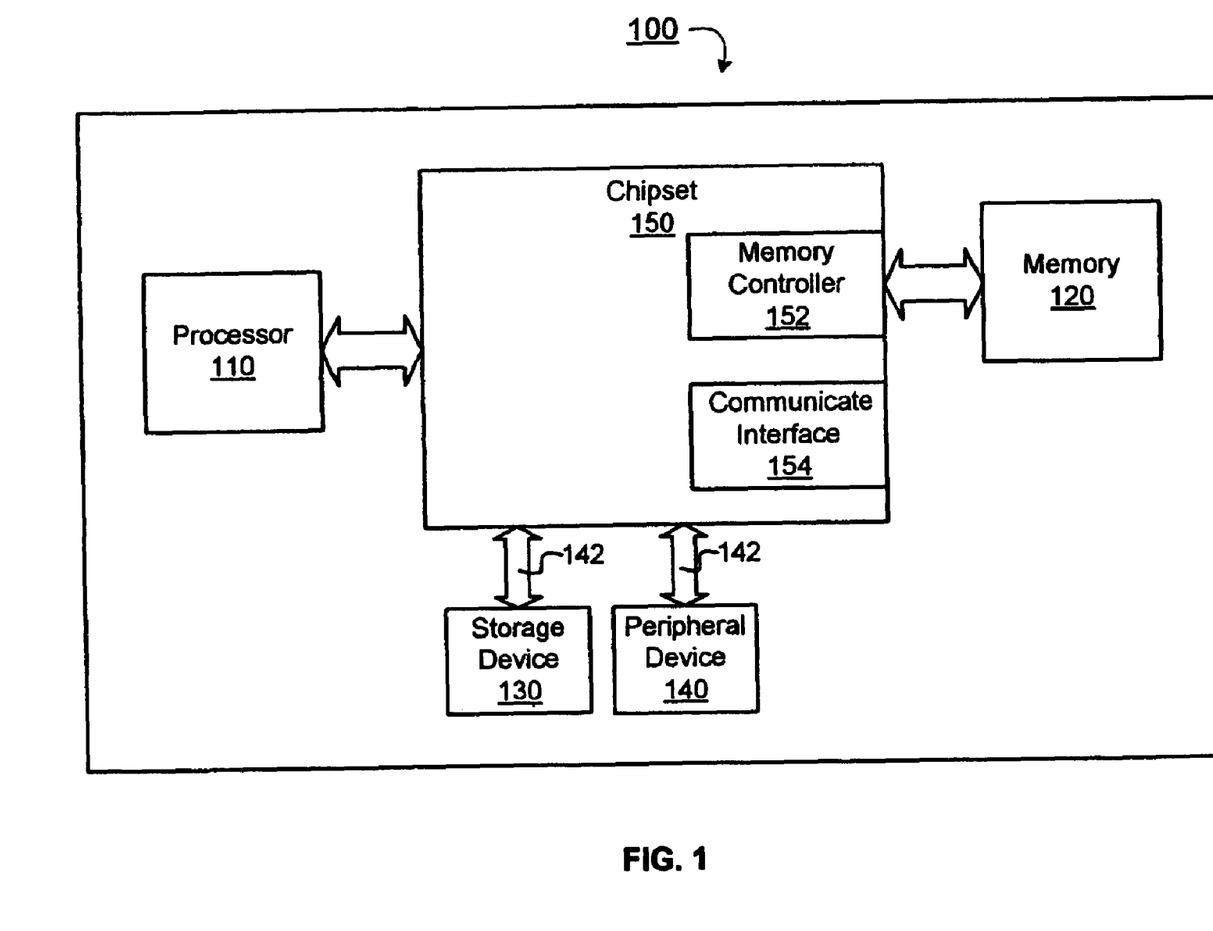
FIG. 1 illustrates an embodiment of a computing device.

FIG. 1 illustrates an embodiment of a computing device 100. Referring to FIG. 1, in one embodiment, the computing device 100 may comprise a housing or case to accommodate the components of the computing device 100. The computing device 100 may comprise one or more processors 110. Each processor 110 may implemented as a single integrated circuit, multiple integrated circuits, or hardware with software routines (e.g., binary translation routines). The processor 110 may perform actions in response to executing instructions. For example, the processor 110 may executes programs, perform data manipulations and control tasks in the computing device 100, etc. The processor 110 may be any type of processor adapted to perform operations in memory 120. For example, processor 110 may be a microprocessor, a digital signal processor, a microcontroller, or any other processors. In one embodiment, the processor 110 may be not dedicated to the use of memory 120, and the processor 110 may perform operations in memory 120 while also performing other system functions.

The memory 120 may comprise memory devices providing addressable storage locations that a memory controller 152 may read data from and/or write data to. The memory 120 may comprise one or more different types of memory devices such as, for example, dynamic random access memory (DRAM) devices, synchronous dynamic random access memory (SDRAM) devices, read-only memory (ROM) devices, or any other volatile or non-volatile memory devices. Moreover, the memory 120 may be arranged in a hierarchal manner. For example, the memory 120 may be arranged in channels, ranks, banks, pages, and columns.

The computing device 100 may further comprise a chipset 150. The chipset 150 may comprise one or more integrated circuit packages or chips that couple the processors 110 to memory 120, one or more storage devices 130, one or more peripheral devices 140, and other components (for example, mouse, keyboard, video controller, or other I/O devices of the computing device 100, etc.). The chipset 150 may receive transactions from the processors 110 and to issue transactions to the processors 110, e.g., via a processor bus. The memory controller 152 may issue transactions to the memory 120, e.g., via a memory bus.

In one embodiment, the storage device 130 may store archive information, such as code, programs, files, data, applications, or operating systems, etc. An example of the storage device 130 may comprise a tape, hard disk (HD) drive, a floppy diskette, a compact disk (CD) ROM, a flash memory device, any other mass storage device, any other magnetic storage media, any other optical storage media, or any other non-volatile memory devices, etc. The chipset 150 may comprise one or more storage device interfaces that may access each storage device 130 via a bus 142.

The computing device 100 may further comprise one or more peripheral devices 140. The peripheral devices 140 may comprise hard discs, optical drivers, mouse, keyboards, universal serial bus (USB) devices, etc. The peripheral device 140 may also comprise a display device. The display device may comprise a display, such as liquid crystal display (LCD), cathode ray tube (CRT), virtual retinal display (VRD), or any other type of display device. The peripheral devices 140 may further comprise any I/O devices to perform I/O functions. Examples of the I/O devices may comprise controller for input devices (e.g., keyboard, mouse, trackball, pointing device), media card (e.g., audio, video, graphics), network card, and any other peripheral controllers. Examples of the peripheral devices 140 may further comprise scanners, printers, faxes, etc.

The computing device 100 may further comprise one or more communication interfaces 154, that may allow software and/or data to be transferred, in the form of one or more signals, between the computing device 100 and one or more external devices, networks and/or information sources. For example, the one or more signals may comprise any signals, such as, for example, electronic, electromagnetic, optical, etc., that may be transferred via wire, cable, optical fiber, phone line, infrared channel, radio frequency channel, etc. The communication interface 154 may comprise a communications port, a telephone modem, a wireless modem, a network interface card and/or any other communication interfaces.

In one embodiment, the computing device 100 may comprise one or more buses 142 that the chipset 150 may use to access the storage devices 130, the peripheral devices 140 and other components in the computing device 100. The buses 142 may comprise, for example, peripheral component interconnect (PCI) buses, accelerated graphics port (AGP) buses, universal serial bus (USB) buses, low pin count (LPC) buses, and/or other I/O buses.

It is to be noted that FIG. 1 illustrates an example of a computing device. Other systems, architectures, and modifications and/or reconfigurations of FIG. 1 are possible. In one embodiment, the present invention may be used in any execution environments, such as, for example, computing devices, desktops, laptops, servers, mobile computing devices, handheld computing devices, mobile phones, and/or digital/electronic equipments.

Figure 2:
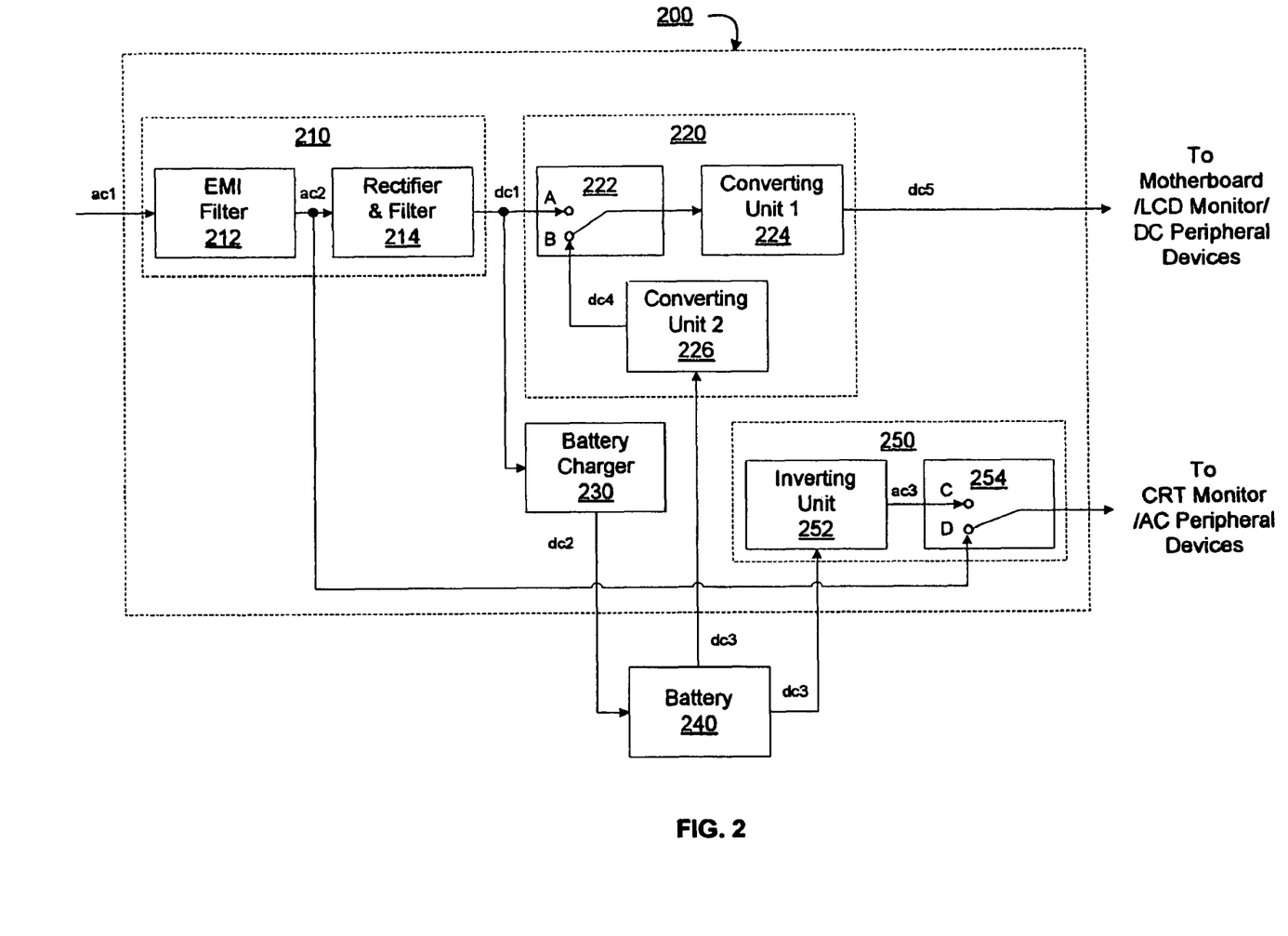
FIG. 2 illustrates an embodiment of a system that may supply power in a computing device.

FIG. 2 is a block diagram that illustrates an example embodiment of a system 200 that may supply power for a computing device, for example, the computing device 100. The system 200 may integrate, e.g., uninterrupted power supply (UPS) and standard power supply unit (PSU) functions. In one embodiment, the system 200 may be arranged in the housing or case of the computing device 100. The system 200 may comprise a rectifier 210, a converter 220, a battery charger 230, and an inverter 250. In one embodiment, the rectifier 210, the battery charger 230, the converter 220 and/or the inverter 250 may be physically integrated into one single printed circuit board (PCB). In another embodiment, the inverter 250 may be designed on a separate PCB so as to provide flexibility/option to include the inverter 250 in the computing device 100 as required by the CRT monitor/other AC peripheral devices, such as, for example, fax machine, printer, and scanner, etc. For example, the system 200 may comprise a first unit that may output an AC output voltage from an AC input voltage, and produce the AC output voltage from a battery voltage in response to a failure of the AC input voltage; and a second unit that may produce a DC output voltage from the AC input voltage, and produce the DC output voltage from the battery voltage in response to the AC input voltage failure or being insufficient. The first unit may comprise the inverter 250 and the second unit may comprise the rectifier 210, the converter 220 and the battery charger 230; however, other embodiments may comprise a different configuration to perform the same functions.

In one embodiment, the rectifier 210 may convert an AC input voltage, for example, ac1 to a first DC voltage, for example, dc1. For example, the rectifier 210 may rectify the AC input voltage to produce the unregulated first DC voltage. The rectifier 210 may comprise an EMI (electromagnetic interference) filter 212 that may filter out electro and/or magnetic interference in the AC input voltage and and/or reduce harmonics in the AC input current to output a filtered AC input voltage ac2; however, other embodiments may comprise a different filter to filter out different interference in the AC input voltage ac1.

In another embodiment, the rectifier 210 may comprise a rectifying unit 214 that may rectify the filtered AC input voltage ac2 to produce the first DC voltage dc1. For example, the rectifying unit 214 may rectify the filtered AC input voltage ac2 having, e.g., a sine waveform to produce the first DC voltage dc1 that may have a half cycle waveform. In one embodiment, the rectifying unit 214 may comprise a diode bridge rectifier, or any other rectifier, to rectify the filtered AC input voltage ac2 to output the first DC voltage dc1. In another embodiment, the rectifying unit 214 may further comprise a filter capacitor that may reduce ripples in the first DC voltage dc1. For example, the rectifier 210 may convert a single-phase sine wave (e.g., 50- or 60-Hz) AC input voltage to the first DC voltage dc1 by means of the diode bridge rectifier. In one embodiment, the first DC voltage dc1 may have an average value of about +300 Volts.

The battery charger 230 may provide a battery charge voltage, for example, dc2 to keep one or more batteries, e.g., 240, charged or a constant trickle charge voltage for the batteries 240 to offset a slight self-discharge. In one embodiment, the battery charger 230 may perform a fast charging operation for battery initial charging and/or recovery charging after deep discharge. For example, at the beginning of the fast charging operation, the battery charger 230 may establish a constant current, for example, by a constant-current regulator. As the charging continues, the battery charge voltage dc2 may rise till it reaches a recovery level, for example, about +14 volts. By this point, the charging model may automatically changes to constant voltage charging, and the charge current may start to gradually decrease. At the end, the charge current may decrease to lower than a given value, for example, about 500 mA, and the battery charge voltage dc2 may be switched from the recovery level to a float level, for example, about 13.7V. In one embodiment, under the fast charge operation, the AC power may be supplied for operating the computing device 100 and may charge one or more batteries 240 that are not connected to a load. In another embodiment, the battery charge voltage dc2 may be controlled in magnitude based on characteristics of different types of batteries.

In another embodiment, the switch to constant voltage trickle charging may occur after the battery has recovered most of the rated capacity over a given period of time, for example, about 80% of the rated capacity. For the constant voltage trickle charging, when the battery is fully charged, the charging voltage and the charging current may be maintained at about 13.7V and about 500 mA, respectively, to compensate for the self-discharge to keep the battery in a fully-charged condition at all times. In one embodiment, under the trickle charge operation, the battery 240 may be kept in a fully-charged condition.

In one embodiment, the converter 220 may convert a DC voltage, e.g., the first DC voltage dc1 outputted from the rectifier 210, into one or more DC outputs at desired voltage levels. In one embodiment, the converter 220 may comprise a first relay (K1) 222 that may switch between a first position A and a second position B. For example, the first relay 222 may be at the first position A to connect the first DC voltage dc1 to a first converting unit 224. The first converting unit 224 may convert the first DC voltage dc1 into one or more DC outputs dc5. For example, the one or more DC outputs dc5 may be respectively supplied to operate a computing device, e.g., motherboard or host. For example, the one or more DC outputs dc5 may be used to power the computing device 100, e.g., the processor 110, the chipset 150, the memory 120, the storage devices 130, or any peripheral devices 140 that use DC power, etc. In another embodiment, the one or more DC outputs dc5 may be at different voltage levels that may comprise +12V, +5V, +3.3V, −12V, etc. In yet another embodiment, the DC outputs dc5 may be electrically isolated from each other.

In another embodiment, when AC power fails, the first relay 222 may connect the battery 240 to a load to supply battery power. For example, referring to FIG. 2, when AC power fails, the first relay 222 may switch to the second position B to connect the output of a second converting unit 226 of the converter 220 to the input of the first converting unit 224, so that the converter 220 may convert a battery voltage dc3 from the battery 240 into one or more DC outputs dc5. For example, the battery 240 may provide the battery voltage dc3 to the second converting unit 226. The second converting unit 226 may convert the battery voltage dc3 into a second DC voltage dc4. The first converting unit 224 may convert the second DC voltage dc4 into one or more DC outputs dc5 that may be, respectively, supplied for the operation of the computing device 100, including the motherboard or host, the storage devices, the LCD monitor, or any other DC peripheral devices. In one embodiment, the battery voltage dc3 may have a voltage level of about +12V. In another embodiment, the second DC voltage dc4 may be an unregulated DC voltage with a voltage level of about +300V. In yet another embodiment, the second DC voltage dc4 may have a voltage level that may be approximately equal to the first DC voltage dc1. In another embodiment, the converter 220 may comprise any other switching unit or relay that may connect the first DC voltage dc1 or the second DC voltage dc4 to the first converting unit 224.

The inverter 250 may supply the filtered AC input voltage ac2 to a CRT monitor and/or any other AC peripheral devices. Referring to FIG. 2, the inverter 240 may comprise a second relay (K2) 254 that may switch between a third position C and a fourth position D. In one embodiment, the second relay 254 may be at the fourth position D to provide the filtered AC input voltage ac2 for the operation of the CRT monitor and/or the AC peripheral devices. In another embodiment, when the AC power fails, the second relay 254 may switch to the third position C to provide an AC output voltage ac3 outputted from an inverting unit 252 to the CRT monitor and/or AC peripheral devices. The inverting unit 252 may convert the battery voltage dc3 from the battery 240 into the AC output voltage ac3. For example, the AC output voltage ac3 may have a voltage level of about 220V. In another embodiment, the inverter 250 may comprise any other switching unit or relay that may provide the filtered AC input voltage ac2 or the AC output voltage ac3 to the CRT monitor and/or other AC peripheral devices.

Figure 3:
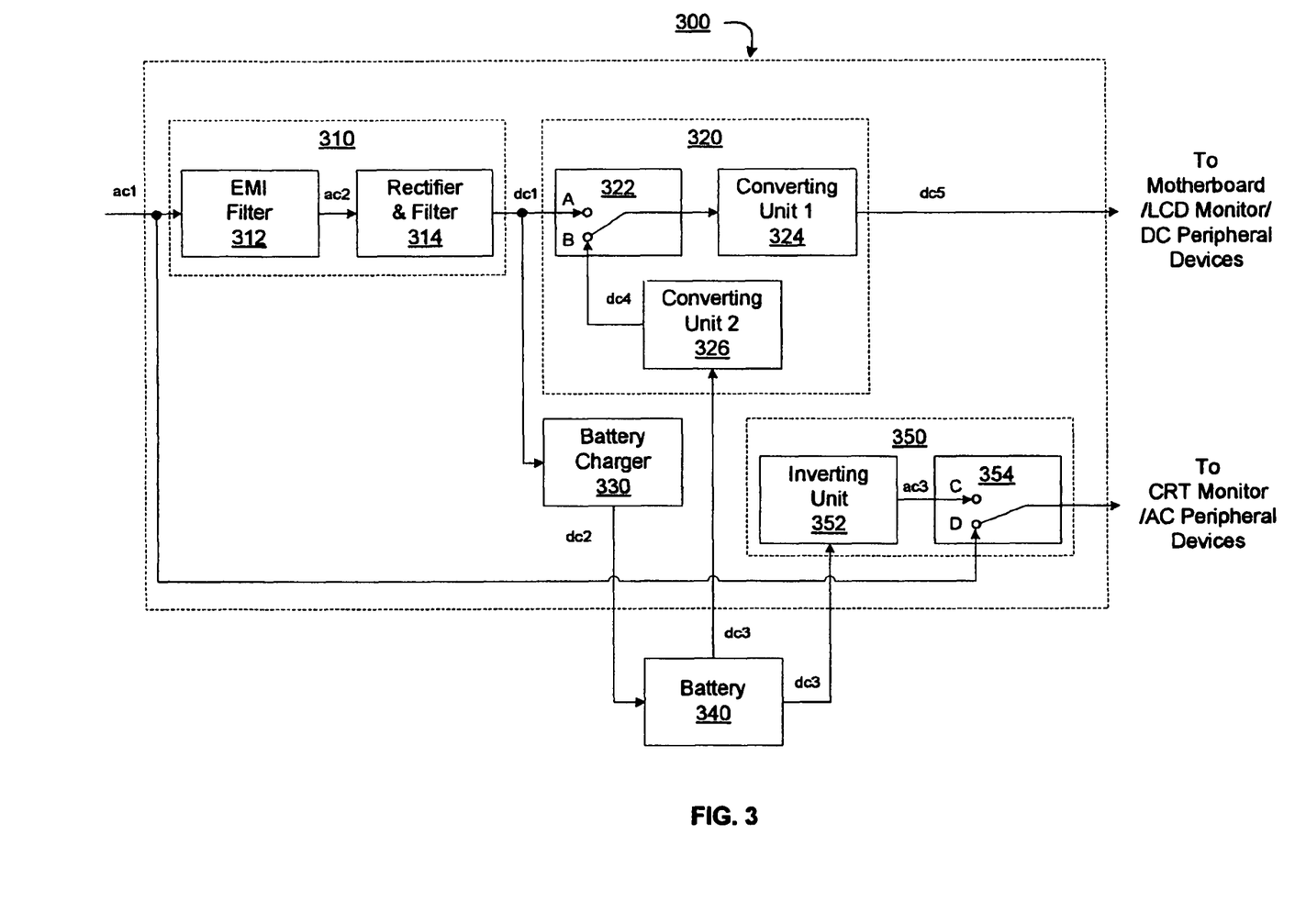
FIG. 3 illustrates another embodiment of a system that may supply power in a computing device.

FIG. 3 illustrates another embodiment of a system 300 that may supply power for a computing device. The system 300 is substantially similar to the system 200 as shown in FIG. 2, except that the system 300 may supply the AC input voltage ac1 to the AC peripheral devices. Although FIGS. 2 and 3 illustrate embodiments of a power supply system, some embodiments may comprise different components, circuitries or architectures to perform the same functions. While the systems 200 or 300 of FIGS. 2 and 3 may supply power to the computing device 100, the system 200 or 300 may further supply power in server environment.

Figure 4:
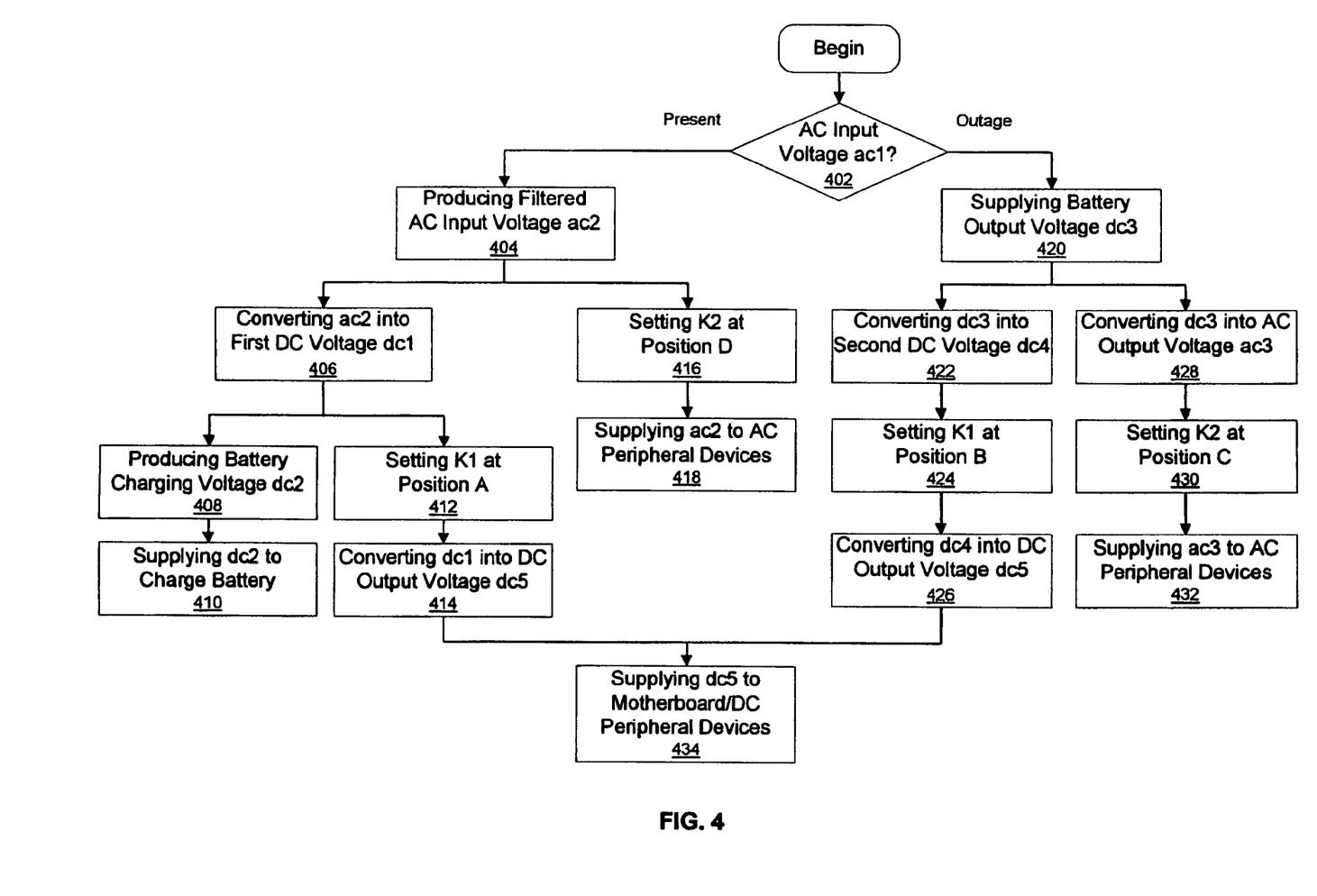
FIG. 4 illustrates an embodiment of a method that may be used to supply power.

FIG. 4 illustrates an embodiment of a method that the system 200 may use to supply power to the computing device 100. In one embodiment, in response to an AC line voltage being present, the system 200 may supply power to the computing device 100, including the motherboard of the computing device 100, the storage devices 130, LCD or CRT monitors, and/or one or more other peripheral devices 140, from the AC side through the rectifier 210 and the converter 220; and meanwhile, the battery bank 240 may be either fully charged or floating charged by the battery charger 230.

Referring to FIG. 4, in one embodiment, in response to the AC input voltage ac1 being present (block 402), e.g., the EMI filter 212 may produce a filtered AC input voltage ac2 (block 404). In block 414, the second relay 254 may be set at the fourth position D, so as to provide the filtered AC input voltage ac2 for the operation of the CRT monitor and/or one or more other AC peripheral devices (block 416). In block 406, e.g., the rectifying unit 214 may convert the AC input voltage ac2 into the first DC voltage dc1. In block 412, the first relay 222 may be set at the first position A, so as to supply the first DC voltage dc1 to the converter 220. For example, in block 414, the first converting unit 224 in the converter 220 may convert the first DC voltage dc1 to produce the one or more DC outputs dc5 for the operation of the motherboard, the storage devices, the LCD monitor and/or one or more other DC peripheral devices (block 434). In block 408, the battery charger 230 may use the first DC voltage dc1 from the rectifier 210 to produce the battery charge voltage dc2, so as to either fully charge or floating charge the battery bank 240 (block 410).

In another embodiment, in response to the AC power being absent or the AC power outage, the computing device 100 may be powered from the battery side through the converter 220 and inverter 250 (e.g., if CRT monitor/other AC peripheral devices are applicable). For example, the battery side may power the computing device 100 in response to a complete power failure situation, for example, a black out, or a partial power failure situation, such as a brown out where power is received but is insufficient or below a required level to power a device.

In one embodiment, in response to the AC input voltage ac1 being absent or below a level required to operate the computing device 100 (block 402), the battery 240 may output the battery voltage dc3 (block 420). In block 428, e.g., the inverting unit 252 may convert the battery voltage dc3 to produce the AC output voltage ac3. In block 430, the second relay 254 may be set at the third position C, so as to supply the AC output voltage ac3 for the operation of the CRT monitor and/or one or more AC peripheral devices (block 432). In block 420, the battery 240 may further supply the battery voltage dc3 to the second converting unit 226 in the converter 220. The second converting unit 226 may convert the battery voltage dc3 to output a second DC voltage dc4 (block 422). In block 424, the first relay 222 may be set at the second position B, so as to supply the second DC voltage dc4 to the first converting unit 224. In block 426, the first converting unit 224 may convert the second DC voltage dc4 to produce the one or more DC outputs dc5 for the operation of the motherboard, the storage devices, the LCD monitor and/or one or more other DC peripheral devices (block 434).

In one embodiment, the first DC voltage dc1 may have a level that is approximately equal to the level of the second DC voltage dc4. In another embodiment, the first DC voltage dc1 may have a level that is not the same as the level of the second DC voltage dc4. In yet another embodiment, the converter 220 may further comprise a third converting unit to convert the second DC voltage dc4 into one or more DC outputs for the operation of the motherboard, the storage devices, LCD monitor and/or one or more other DC peripheral devices.

Although the method of FIG. 4 is described with regard to the system 200 of FIG. 2, the method of FIG. 4 may also be used in the system 300 of FIG. 3 if block 404 is deleted, block 406 is changed to convert the AC input voltage ac1, and block 418 is changed to supply the AC input voltage ac1. While the method of FIG. 4 is illustrated as a sequence of operations, the illustrated operations may be performed in a different order. For example, the first relay 222 and the second relay 254 may be set at the first position A and the fourth position D, respectively, in response to the AC side voltage; the first relay 222 and the second relay 254 may be set at the second position B and the third position C, respectively, in response to a power failure of the AC side voltage, for example, a complete power failure or a partial power failure. In another embodiment, the respective voltage supplying blocks, such as blocks 410, 434, 418, 432 may be omitted, in response to the corresponding devices being absent in the computing device 100.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system to supply power to a computing device, comprising:
   a first unit that outputs an AC output voltage from an AC input voltage, and produces the AC output voltage from a battery voltage in response to a failure of the AC input voltage; and
   a second unit that produces a DC output voltage from the AC input voltage, and produces the DC output voltage from the battery voltage in response to the AC input voltage failure,
   wherein the first unit and the second unit are provided in a housing of the computing device.

2. The system of claim 1, the second unit comprising:
   a rectifier that produces a first DC voltage from the AC input voltage; and
   a converter that converts the first DC voltage into the DC output voltage, and converts the battery voltage to produce the DC output voltage in response to the failure of the AC input voltage.

3. The system of claim 1, the first unit comprising:
   an inverter that converts the battery voltage into the AC output voltage.

4. The system of claim 1, the second unit comprising:
   a rectifier that produces a first DC voltage from the AC input voltage;
   a second converting unit that converts the battery voltage into a second DC voltage;
   a first converting unit that converts the first DC voltage into the DC output voltage, and converts the second DC voltage into the DC output voltage in response to the AC input voltage failure; and
   a first switching unit that switches between a first position to couple the first DC voltage to the first converting unit and a second position to couple the second DC voltage to the first converting unit.

5. The system of claim 1, the first unit comprising:
   an inverting unit that converts the battery voltage into the AC output voltage; and
   a second switching unit that switches between a third position to output the AC output voltage and a fourth position to output the AC input voltage.

6. The system of claim 2, the second unit further comprising:
   a charger that uses the first DC voltage to produce a battery charging voltage.

7. The system of claim 2, the rectifier further comprising:
   a filter that produces a filtered AC input voltage from the AC input voltage; and
   a rectifying unit that converts the filtered AC input voltage into the first DC voltage,
   wherein an uninterruptible power supply unit outputs the AC output voltage from the filtered AC input voltage, and an power supply unit produces the DC output voltage from the filtered AC input voltage.

8. A power supply for a computing device comprising:
   a rectifier that converts an AC input voltage into a first DC voltage;
   a converter that converts the first DC voltage into one or more DC outputs, and converts a battery voltage into the one or more DC outputs in response to an absence of the AC input voltage;
   an inverter that converts the battery voltage into an AC output voltage in response to the absence of the AC input voltage,
   wherein the rectifier, the converter and the inverter are provided in a housing of the computing device.

9. The power supply of claim 8, further comprising:
   a charger that couples to the rectifier to produce a battery charging voltage.

10. The power supply of claim 8, the converter comprising:
    a first switching unit that switches between a first position to couple the first DC voltage to the converter and a second position to couple the battery voltage to the converter.

11. The power supply of claim 8, the converter comprising:
    a second converting unit that converts the battery voltage into a second DC voltage;
    a first converting unit that converts the first DC voltage into the one or more DC outputs, and converts the second DC voltage into the one or more DC outputs in response to the absence of the AC input voltage; and
    a first switching unit that switches between a first position to input the first DC voltage to the first converting unit and a second position to input the second DC voltage to the first converting unit.

12. The power supply of claim 8, the inverter comprising:
    a second switching unit that switches between a third position to output the AC output voltage and a fourth position to output the AC input voltage.

13. The power supply of claim 8, the inverter comprising:
an inverting unit that converts the battery voltage into the AC output voltage; and
a second switching unit that switches between a third position to couple to the inverting unit and a fourth position to couple to the rectifier.

14. The power supply of claim 8, the rectifier comprising:
a filter that filters out interference in the AC input voltage to produce a filtered AC input voltage; and
a rectifying unit that converts the filtered AC input voltage into the first DC voltage,
wherein the inverter outputs the filtered AC input voltage in response to the AC input voltage.

15. A method to supply power to a computing device, comprising:
Integrating a uninterruptible power supply and a power supply unit into a housing of the computing device;
in response to an AC input being present, outputting an AC output and producing a DC output from the AC input; and
in response to a failure of the AC input, producing the AC output from a battery input and producing the DC output from the battery input.

16. The method of claim 15, further comprising:
in response to the AC input being present, converting the AC input into a first DC input; and
converting the first DC input into the DC output.

17. The method of claim 15, further comprising:
in response to the AC input being present, converting the AC input into a first DC input; and
converting the first DC input into a battery charging output.

18. The method of claim 15, further comprising:
in response to the AC input failure, converting the battery input into a second DC input; and
converting the second DC input into the DC output.

19. The method of claim 15, further comprising:
in response to the AC input being insufficient for the operation of the computing device, converting the battery input into the AC output.

20. The method of claim 15, further comprising:
supplying the AC input to one or more AC peripheral devices of the computing device; and
supplying the DC output from the DC input to a motherboard of the computing device and one or more DC peripheral devices of the computing device.

21. The method of claim 15, further comprising:
supplying the AC output to one or more AC peripheral devices of the computing device; and
supplying the DC output from the battery input to the motherboard of the computing device and one or more DC peripheral devices of the computing device.

22. A system, comprising:
a processor to perform one or more functions in the system; and
a power supply system to power the processor from an AC input, and power the processor from a battery input in response to the AC input being insufficient to operate the processor,
a housing of the processor to accommodate and the power supply system.

23. The system of claim 22, the power supply system comprising:
a rectifier to convert the AC input into a first DC input;
a converter to produce one or more DC outputs from the AC input, and produce the one or more DC outputs from the battery input in response to absence of the AC input; and
an inverter to produce an AC output at the output of the power supply system from the battery input in response to the absence of the AC input.

24. The system of claim 23, the power supply system further comprising:
a charger that couples to the rectifier to convert the first DC input into a battery charging output.

25. The system of claim 23, the converter comprising:
a first converting unit to convert the first DC input into the one or more DC outputs;
a second converting unit to convert the battery input into a second DC voltage,
a first switching unit to switch between a first position in response to the presence of the AC input and a second position in response to the absence of the AC input, wherein the first switching unit at the first position couples the rectifier to the first converting unit, the first switching unit at the second position couples the second converting unit to the first converting unit for the first converting unit to convert the second DC voltage into the one or more DC outputs.

26. The system of claim 23, the inverter comprising:
an inverting unit to convert the battery input into the AC output voltage; and
a second switching unit to switch between a third position in response to the absence of the AC input and a fourth position in response to the presence of the AC input, wherein the second switching unit at the third position couples the inverting unit to the output of the power supply system, and the second switching unit at the fourth position couples the rectifier to the output of the power supply system.

27. The system of claim 23, the rectifier comprising:
a filter to produce a filtered AC input from the AC input; and
a rectifying unit to convert the filtered AC input into the first DC input.

28. The system of claim 27, the inverter comprising:
an inverting unit to convert the battery input into the AC output; and
a second switching unit that switches between a third position to provide the AC output voltage at the output of the power supply system and a fourth position to provide the filtered AC input voltage at the output of the power supply system.

29. The system of claim 22, the power supply system comprising:
a rectifier to convert the AC input into a first DC input;
a convert to produce one or more DC outputs from the AC input, and produce the one or more DC outputs from the battery input in response to the AC input being insufficient to operate the system; and
an inverter to output the AC input at an output of the power supply system, and produce an AC output at the output of the power supply system from the battery input in response to the AC input being insufficient to operate the system.

* * * * *

UNITED STATES PATENT AND TRADEMARK OFFICE
CERTIFICATE OF CORRECTION

PATENT NO. : 7,851,944 B2  
APPLICATION NO. : 10/581756  
DATED : December 14, 2010  
INVENTOR(S) : Li et al.

Page 1 of 1

It is certified that error appears in the above-identified patent and that said Letters Patent is hereby corrected as shown below:

In column 9, at line 59 after, -- accommodate -- delete "and".

Signed and Sealed this
Fifth Day of July, 2011

David J. Kappos
*Director of the United States Patent and Trademark Office*